June 23, 1931. H. A. GEMBERLING ET AL 1,811,267
TRACTOR HITCH
Filed July 26, 1929 3 Sheets-Sheet 1
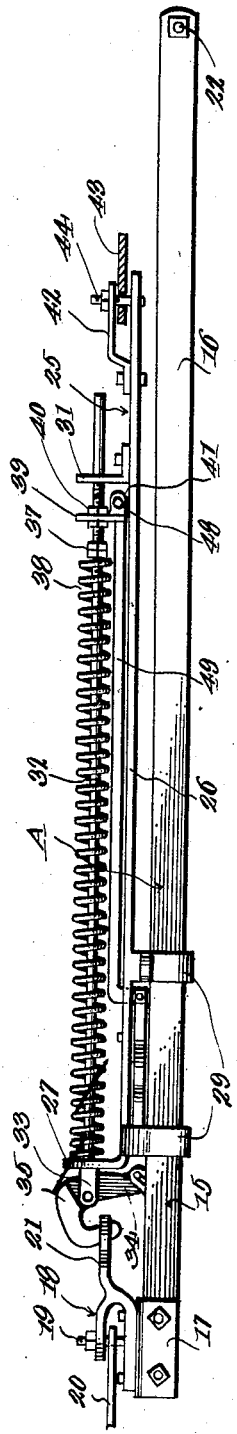
Inventors
HARRY A. GEMBERLING
ASLE BJELLA
Attorney

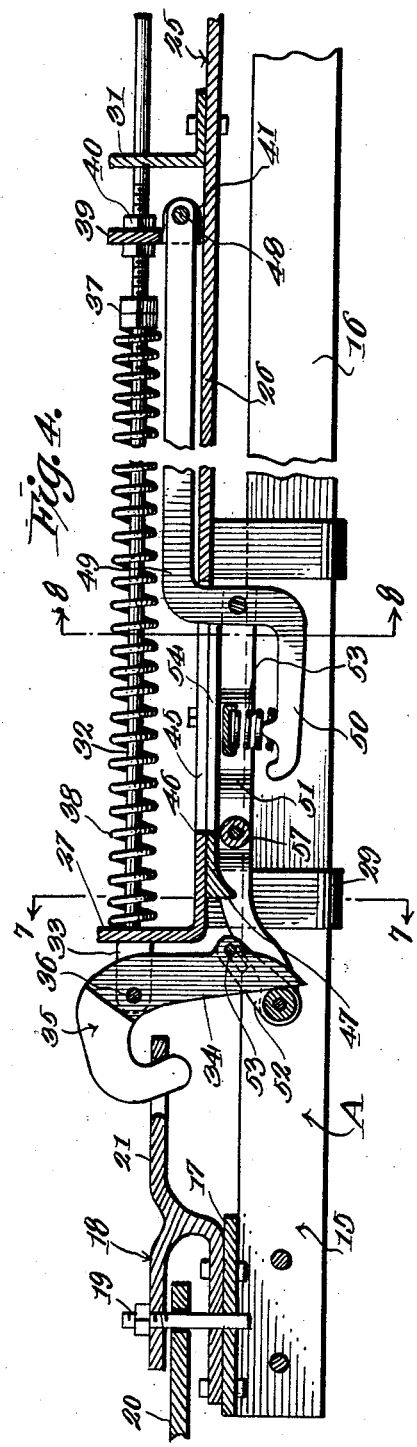

June 23, 1931.  H. A. GEMBERLING ET AL  1,811,267
TRACTOR HITCH
Filed July 26, 1929  3 Sheets-Sheet 3
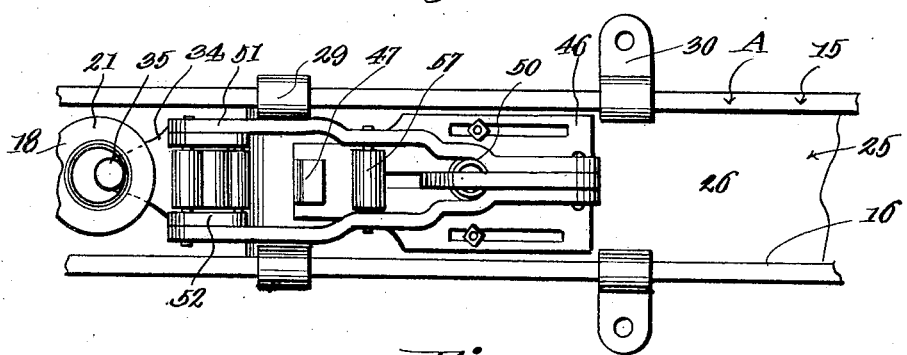
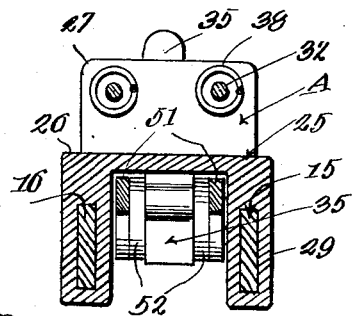
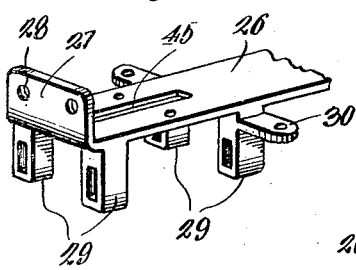
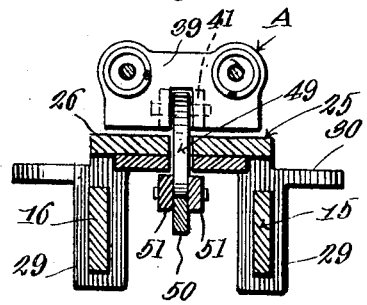
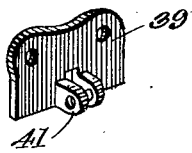
Inventors
HARRY A. GEMBERLING
ASLE BJELLA
By Irving L. McCathran
Attorney Patented June 23, 1931

1,811,267

UNITED STATES PATENT OFFICE

HARRY A. GEMBERLING AND ASLE BJELLA, OF EPPING, NORTH DAKOTA

TRACTOR HITCH

Application filed July 26, 1929. Serial No. 381,362.

This invention appertains to novel means for connecting an agricultural implement, such as a gang plow or the like, to a tractor and has for one of its primary objects to provide a tractor hitch of rugged construction which will automatically release itself when the farm implement hits a solid object such as a tree stump, rock or the like, and which permits the automatic coupling of the parts when the tractor is reversed.

Another salient object of our invention is the provision of a tractor hitch for farm implements which will automatically release when the farm implement hits a solid object allowing the parts to have a limited sliding movement, at which time the clutch throw out is operated for stopping the machine, the parts remaining slidably connected at all times, thereby permitting the easy and automatic recoupling of the parts upon the reversing of the tractor.

A further salient object of our invention is the provision of a novel coupling head or hook for engaging the coupling clevis of a tractor and hitch, the same being so constructed as to permit the automatic swinging thereof from out of engagement with the clevis when the farm implement strikes a solid object and for automatically reengaging the clevis upon the backing of the tractor and the engagement of the clevis with the shank of said head or hook.

A further important object of our invention is the provision of a novel tensioning device movable with the coupling head for holding the parts in proper position at all times during the coupling and uncoupling operation.

A still further object of our invention is to provide an improved tractor hitch of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a side elevation of our improved tractor hitch;

Figure 2 is a top plan view thereof;

Figure 3 is a central longitudinal section through the improved hitch showing the parts in their uncoupled or released position, with the tractor draw bar moved forwardly to its fullest extent;

Figure 4 is an enlarged longitudinal sectional view through our improved hitch showing the parts in their coupled position;

Figure 5 is a similar view with the parts in their initial released position and just prior to the moving of the tractor draw bar to its complete forward position;

Figure 6 is an enlarged fragmentary bottom plan view of the tractor hitch showing the parts in their coupled position;

Figure 7 is a transverse section through the hitch taken on the line 7—7 of Figure 5 looking in the direction of the arrows;

Figure 8 is a transverse section through the improved tractor hitch taken on the line 8—8 of Figure 5 looking in the direction of the arrows;

Figure 9 is a perspective view of the carrier plate or the farm implement draw bar portion of the hitch, and Figure 10 is a detail perspective view of a guide plate used in connection with the hitch.

Referring to the drawings in detail, wherein similar reference characters designate corresponding parts throughout the several views, the letter A generally indicates our improved tractor hitch which comprises a tractor draw bar portion 15 and a farm implement draw bar portion 25. The tractor draw bar portion 15 includes a pair of spaced parallel longitudinally extending elongated vertically disposed bars or straps 16, which are connected together at their forward ends by a substantially U-shaped plate 17 to which is bolted or otherwise secured the clevis 18 carrying the coupling pin or bolt 19, which engages the draw bar or coupling bar 20 of the tractor (not shown). The clevis 18 has a rearwardly extending eye 21 formed thereon. This eye 21 is arranged in spaced parallel relation to the bars 16 and is disposed in a horizontal plane as clearly shown in Figures 1 and 2 of the drawings.

The rear ends of the bars 16 are connected together by a cross bolt 22 which constitutes a stop, as will be later described.

The implement draw bar portion 25 comprises a flat plate 26 disposed in a horizontal plane and this plate is arranged above the bars 16 and normally terminates short of the opposite ends thereof. The extreme front end of the plate 26 is bent up to provide a right angularly disposed guide plate 27 which is provided with a pair of spaced apertures 28, the purpose of which will also be more fully brought out.

Depending from the plate 26 at the opposite side edges thereof and adjacent to the forward end thereof are pairs of apertured guide ears or lugs 29 which receive the bars 16 for sliding movement. The rear pair of lugs 29 carry laterally extending apertured flat ears 30, as clearly shown in Figures 2 and 9. The plate 26 at a point intermediate its ends and adjacent to the rear end thereof carries an upstanding guide bracket plate 31, which is provided with a pair of apertures which aline with the apertures 28 for slidably receiving a pair of spaced pull rods 32, for a purpose which will be also hereinafter more fully described. These rods 32 extend beyond the front plate 27 and have formed thereon heads 33 which limit the rearward movement of the pull rods 32 relative to the plate 26. These heads 33 receive between the same the shank 34 of a draw head or hook 35, a bolt 36 being extended through the head 33 and the draw head or hook 35, allowing free swinging movement of the draw head relative to the pull rods 32. The shank 34 extends below the plate 26 and its lower end is normally disposed between the bars 16. Each of the pull rods 32 has threaded thereon a nut 37, and relatively heavy expansion springs 38 are placed about the pull rods 32 and bear against, at their opposite ends, the guide plate 27 and nuts 37, respectively, and by adjusting the nuts 37, it can be seen that the tension of the springs 38 can be controlled and consequently the pull on the draw head or hook 35 controlled.

A guide and supporting plate, shown in detail in Figure 10 of the drawings, 39 is carried by the pull rods 32 and the position of this guide and supporting plate 39 can be adjusted on said rods 32 by the means of nuts 40 adjustable on said pull rods and engageable with the opposite sides of the plate 39. This plate 39 at its lower end is provided with rearwardly extending ears 41, for a purpose which will be later described.

It is to be noted that the extreme rear end of the plate 26 carries a clevis 42 for receiving the pull or draw bar 43 of the farm implement (not shown).

The plate 26 adjacent to its forward end is provided with a central longitudinal slot 45 and the lower surface of the plate at this point has bolted thereto a similar slotted plate 46, the forward end of which is provided with a cam 47. Pivotally connected to the pivot ears 41 of the guide and supporting plate 39, by means of a bolt 48, is a forwardly extending lever 49, which lever is provided with a depending and forwardly extending offset arm 50 which extends through the slots 45 of the plate 26 and the slots of the plate 46. The offset vertical portion of the arm 50 of the lever 49 has pivotally connected thereto the forwardly extending lever 51 which in turn has pivotally connected thereto a short link 52 which is connected by means of a pin and slot connection 53 with the shank 34 of the draw head or hook 35. The lever 51 is preferably in the nature of a pair of spaced parallel straps and the straps are connected by a cross brace or strip 54 against which bears a short expansion spring 55 which is coiled about a boss or lug 56 formed on the horizontal portion of the offset arm 50.

By this arrangement is can be seen that the lever 51 and the lever 49 with its offset arm 50 move as a unit and thus the expansion spring 55 exerts a continuous upward pressure on the lever 51 to hold the same in a raised position and a roller 57, which the lever 51 carries, against the plate 46, for a purpose which will also be later described.

In operation of the improved device, the various parts of the tractor hitch are connected as shown in Figures 1 and 4, with the bill of the hook or draw head 35 in the eye 21 of the clevis. The clevis 18 is connected by means of the bolt 19 to the draw bar 20 of the tractor, while the clevis 42 is connected by means of the bolt or pin 44 with the tongue or draw bar of the plow or other farm implement.

The plow or other farm implement is now drawn across the field by the tractor and should one or more of the plows strike a solid object such as a rock or a stump, the pull on the eye 21 will overcome the tension of the expansion springs 38, thus pulling the rods 32 forwardly therewith, while the plate 26 remains stationary. Simultaneously with the forward movement of the rods 32, the levers 49 and 51 are likewise moved forwardly and the roller 57 will contact with the cam face 47 which will draw the lever 51 downward against the tension of the expansion spring 55. This will throw the shank of the draw head or hook 35 forwardly and lift the bill of the hook or draw head from out of engagement with the eye, as clearly shown in Figure 5 of the drawings. This will permit forward movement of the eye independent of the draw bar 25 which is connected with the farm implement and the draw bar 15 which is connected with the tractor will be moved forwardly in the depending guides 29. Immediately upon the striking of the plow bottom with the solid object, the clutch of the tractor is thrown out and the tractor is brought to a standstill. The draw bar 15 can move forwardly a considerable distance and until the bolt 22 strikes the rearmost pair of guide ears 29, at which time the operator will have had ample time to bring the tractor to a halt. This will effectively prevent injury to plow bottoms, tractor and hitch.

At this time, it is to be noted that the link 52 and the shank 34 of the draw bar head or hook 35 form a toggle and it is to be noted that as soon as pull is released on the hook by the eye 21 of the clevis, the rods 32 will be returned to their normal position by the springs 38 and thus move the head of the hook back against the front plate 27 and the parts will be arranged as shown in Figure 3 of the drawings.

If it is now desired to recouple the various parts of the hitch, the tractor is reversed and the eye 21 will strike the shank portion of the hook, bringing the hook on its pivot and moving the parts back to the position shown in Figure 4 of the drawings with the bill of the hook in the eye.

The hitch is now ready for operation.

It can be seen from the foregoing that we have provided a novel hitch in which the parts always remain coupled together, but which have a releasable sliding connection, which permits the reconnection of the various parts in a minimum amount of time without effort on the part of the operator.

Changes in details may be made without departing from the spirit or the scope of this invention, but:

What we claim as new is:

1. A tractor hitch comprising a pair of slidably connected sections, a clevis carried by one section for connection with a tractor, a clevis carried by the other section for connection with a farm implement, a pivoted draw bar head carried by the section having the clevis for the farm implement and normally engageable with the clevis of the other section, resilient means normally holding the pivoted draw bar head in engagement with the clevis, said resilient means being adapted to be overcome when undue stress is placed upon the section carrying the clevis for the farm implement to permit the release of the draw bar head from the clevis of the first mentioned section.

2. A tractor hitch comprising a pair of slidably connected sections, a clevis carried by one section for connection with a tractor, a clevis carried by the other section for connection with a farm implement, a pivoted draw bar head carried by the section having the clevis for the farm implement and normally engageable with the clevis of the other section, resilient means normally holding the pivoted draw bar head in engagement with the clevis, said spring means being adapted to be overcome when undue stress is placed upon the section carrying the clevis for the farm implement to permit the release of the draw bar head from the clevis of the first mentioned section, and means for limiting the sliding movement of the sections relative to one another upon the release of the draw head from said clevis.

3. A tractor hitch comprising a pair of slidably connected sections, a clevis carried by one section for connection with a tractor, a clevis carried by the other section for connection with a farm implement, a draw head including a bill and a depending shank, a rod slidably carried by the last section, means pivotally connecting the shank of the draw head adjacent to the bill to said rod, resilient means normally holding the rod in a rearward position and the bill of the hook in engagement with the tractor clevis, a lever movable with the rod, a second lever pivotally connected to the first lever, a link pivotally connecting the second lever to the shank of the draw head adjacent to the lower end thereof, resilient means carried by the first lever and engaging the second lever for normally holding the same in a raised position, a roller carried by the second lever, and a cam arranged in the path of the roller, as and for the purpose specified.

4. A tractor hitch comprising a pair of slidably connected sections, a clevis carried by one section for connection with a tractor, a clevis carried by the other section for connection with a farm implement, a draw head including a bill and a depending shank, a rod slidably carried by the last section, means pivotally connecting the shank of the draw head adjacent to the bill to said rod, resilient means normally holding the rod in a rearward position and the bill of the hook in engagement with the tractor clevis, a lever movable with the rod, a second lever pivotally connected to the first lever, a link pivotally connecting the second lever to the shank of the draw head adjacent to the lower end thereof, resilient means carried by the first lever and engaging the second lever for normally holding the same in a raised position, a roller carried by the second lever, a cam arranged in the path of the roller, and means for adjusting the tension of said spring.

5. A tractor hitch comprising a main draw bar section, a clevis carried by said section for connection with a tractor, a supplemental section slidably connected with the first section, a clevis connected with the supplemental section for connection with a farm implement, a pair of rods slidably carried by the supplemental section, a draw bar head including a bill and a depending shank pivotally connected to the forward terminals of said rod adjacent to the bill, an eye carried by the tractor clevis for normally receiving the bill of the draw bar head, expansion springs coiled about said rods and normally holding the bill of the draw bar head in engagement with the eye, a supporting plate movable with said rods, a forwardly extending lever connected with the supporting plate, a second lever pivotally connected to the first lever, a link pivotally connected to the forward end of the second lever and slidably and pivotally connected to the shank of the draw bar head adjacent to the lower end thereof, spring means carried by the first lever engaging the second lever for normally holding the same in a raised position, a roller carried by said second lever, and a cam face carried by the supplemental section and arranged in the path of said roller, as and for the purpose specified.

In testimony whereof we affix our signatures.

HARRY A. GEMBERLING.
ASLE BJELLA.